United States Patent [19]

Ehrat

[11] 3,711,645

[45] Jan. 16, 1973

[54] METHOD AND APPARATUS FOR CODING MESSAGES

[75] Inventor: Kurt Ehrat, Zurich, Switzerland

[73] Assignee: Ciba-Geigrf A G, Basel, Switzerland

[22] Filed: Nov. 23, 1970

[21] Appl. No.: 91,790

[30] Foreign Application Priority Data

Nov. 29, 1969 Switzerland ........................17736/69

[52] U.S. Cl. ............................178/22, 178/4, 331/78

[51] Int. Cl. ................................................H04l 9/02

[58] Field of Search ..........178/22, 4; 325/32; 331/78

[56] References Cited

UNITED STATES PATENTS 3,291,908 12/1966 Ehrat......................................178/22

3,427,399 2/1969 Ehrat......................................178/22

3,439,279 4/1969 Guanella................................331/78

3,614,316 10/1971 Andrews, Jr. ..........................178/22

*Primary Examiner*—Benjamin A. Borchelt

*Assistant Examiner*—H. A. Birmiel

*Attorney*—Pierce, Scheffler & Parker

[57] ABSTRACT

A method and apparatus for coding messages is provided comprising coding the clear information by an encoding program generated by a secret basic code and modified by selected parts of a non-secret supplementary code, the coded information be recorded together with the whole of the supplementary code on a common record medium. The selection of parts of the supplementary code is controlled by the secret basic code.

14 Claims, 7 Drawing Figures

METHOD AND APPARATUS FOR CODING MESSAGES

This invention relates to a method of and apparatus for coding information by mixing the clear information with a pseudo-statistical encoding program generated by a secret basic code and a non-secret supplementary code, the encoded message obtained by the mixture of clear information with the coding program as well as the supplementary code being recorded on a common storage medium which is decoded by operations inverse to those carried out for coding the information.

In some methods of this kind hitherto known in the art the entire supplementary code is used for modifying the encoding program. Since the supplementary code is recorded on the storage medium, this together with the encoded information may fall into unauthorized hands. From the supplementary code and the encoded information the clear message can be extracted fairly quickly with the aid of modern computing equipment.

The present invention seeks to avoid this drawback by modifying the encoding program by only parts of the supplementary code selected by a selecting program itself derived from the secret basic code.

Apparatus for performing this method comprises a generator for generating a basic code and a generator for generating a supplementary code, and means controlled by these codes to generate a pseudo-statistical encoding program, gating means being interposed between the means generating the encoding program and the random generator and controlled by the encoding program generating means.

A preferred embodiment of the invention will now be described with reference to the accompanying drawings in which.

Figure 1:
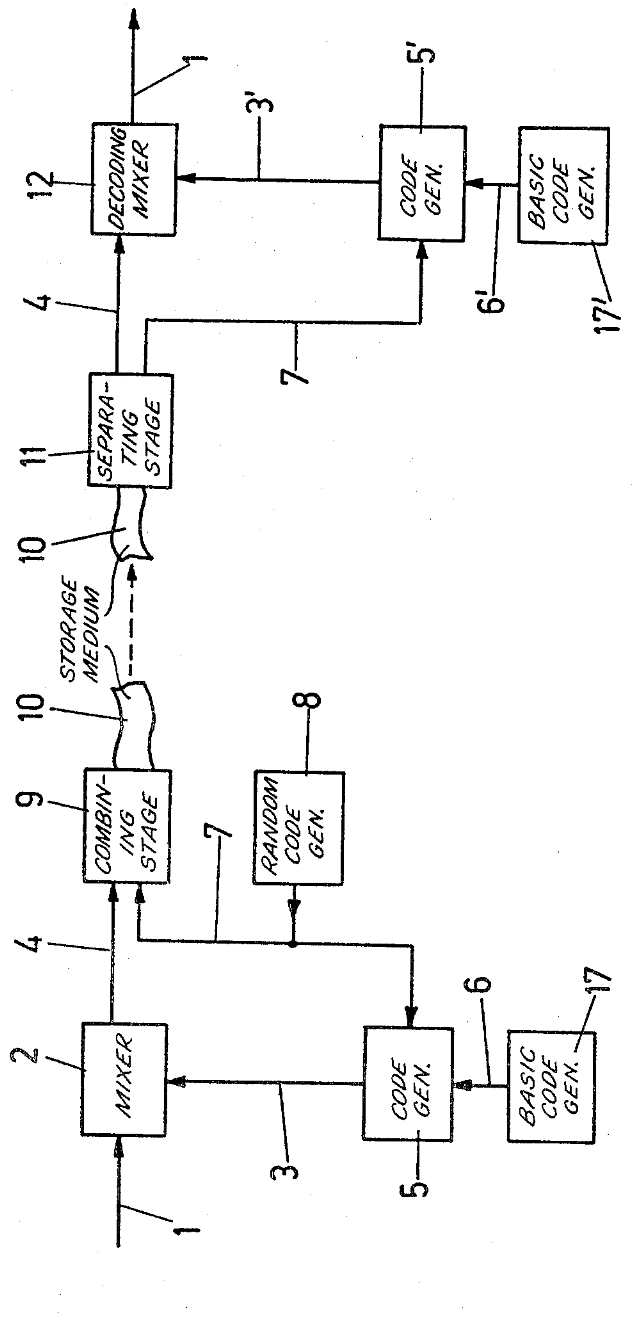
FIG. 1 is a block diagram of a conventional encoding and decoding station.

In FIG. 1 a clear message 1 is mixed in a mixer with an encoding program 3 for the generation of an encoded message 4. The encoded message 4 is recorded on a storage medium 10 which in the illustrated example is assumed to be a punched tape. However, data recording media other than punched tapes, such as magnetic tapes or printed sheets or tapes could be used. The encoding program 3 is a pseudo-statistical series of signals generated by a code generator 5 whose internal switching states vary according to complex rules of extremely long periodicity. The internal switching states and the switching sequence of the code generator are controlled by at least two factors, namely a secret basic code 6 and a non-secret supplementary code 7. The secret basic code is generated in a basic code generator 17 and for the generation of, for instance, a sequence of numbers or letters use may be made of a message punched on cards or tape or a specially connected printed plate. As implied by its nomendature this secret basic coding information 6 must not be known to unauthorized persons. The supplementary code 7 is generated by a random code generator 8 and may consist of a random sequence of numbers or letters or a random sequence of binary signals. The secret basic code may remain the same for a major number of messages or parts of messages, whereas the supplementary code is freshly generated for each message or each part of a message. The purpose of the supplementary code is to prevent different messages or different parts of a message from being encoded by the same encoding program. The supplementary code 7 and the encoded message 4 are both recorded on the storage medium 10. For this purpose these two pieces of information are combined in a stage 9. The storage medium 10 is physically carried to the decoding station.

Decoding proceeds as illustrated in the right hand part of the block diagram in FIG. 1 which is nearly of the same construction as the encoding station. In a separating state 11 the supplementary coding information 7 is separated from the encoded message 4 and transmitted to the code generator 5' where in the same way as in the encoding station at the left of the figure an encoding program 3' is formed with the aid of a basic code 6'. The basic code generators 17 and 17' on the one hand and the code generators 5 and 5' on the other hand are of identical construction. If the basic codes 6 and 6' are identical the encoding program 3 and 3' will also be identical since the supplementary code 7 is obtained at the decoding station in its original form. The encoded message 4 and the encoding program 3' are taken to a mixer 12 which in a manner that is well understood re-generates the original message 1 in clear.

In order to discriminate at the receiving station between the information on the storage medium 10 that belongs to the supplementary code and that which belongs to the encoded message each supplementary code may be preceded by a special signal or counters may be used for counting the code signal.

Figure 2:
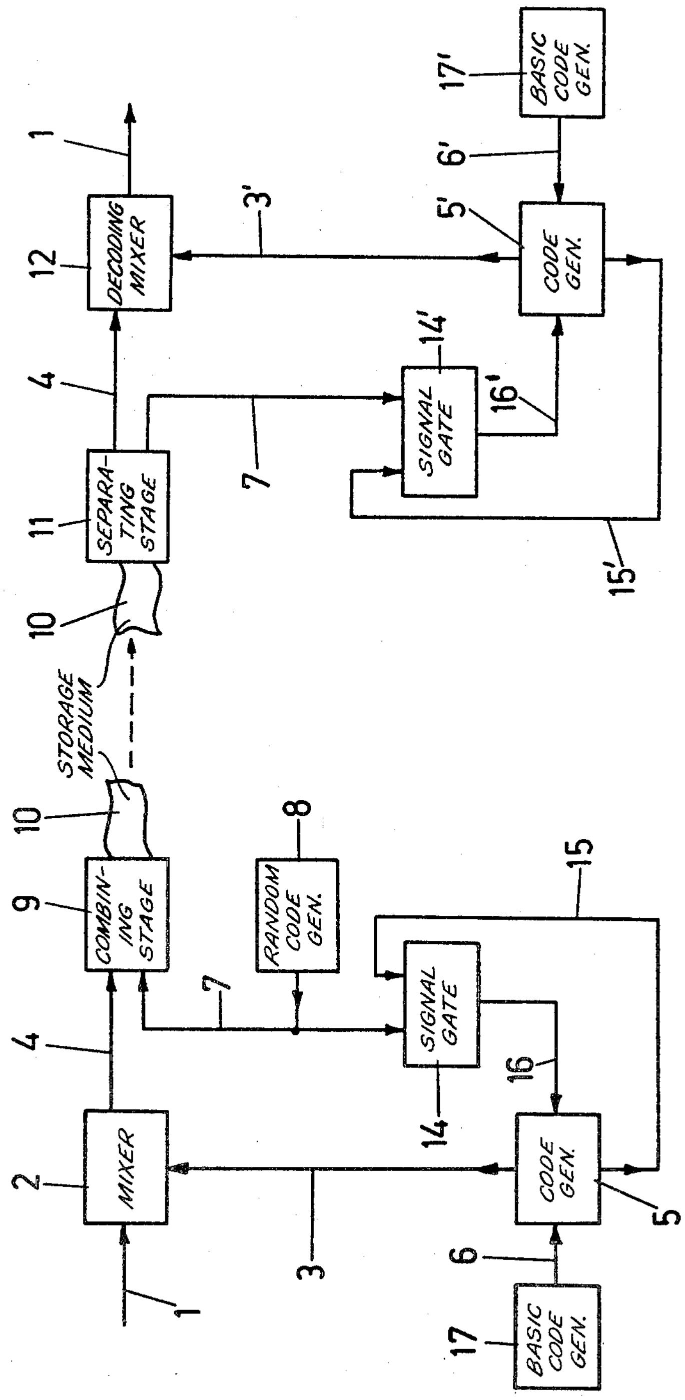
FIG. 2 is a block diagram of an embodiment of an encoding and decoding station for performing the method according to the invention.

The manner in which the proposed arrangement shown in FIG. 2 functions agrees in principle with FIG. 1 and like reference numbers in FIGS. 1 and 2 are used for like components. New in FIG. 2 is the provision of controlled signal gates 14 (sender) and 14' (receiver) between the random generator 8 and separating stage 11 and the code generators 5 and 5' respectively. The effect of the signal gate 14 is to pass only a selected proportion 16 according to a selecting program 15 of the total supplementary code 7 generated by the random generator 8 and to apply only this selected part to the code generator 5. The selecting program 15 is obtained in the same way as the encoding program 3 from the code generator 5 and depends upon the internal switching states and the switching sequence in the code generator 5. Hence the selecting program also depends upon the basic code 6 and is unknown to an unauthorized person. The entire supplementary coding information generated by the random generator is stored in the storage medium 10, whereas only the selected supplementary coding information 16 is used for modifying the operation of the code generator 5. Hence unauthorized persons who may come into possession of the storage medium 10 are in practice unable to find out which parts of the supplementary coding information has been used for modifying the encoding program generated by the code generator 5.

At the decoding station in FIG. 2 the storage medium 10 is fed into the separating stage 11 where the supplementary coding information 7 is separated from the encoded message 4 and fed to the signal gate 14'. At the signal gate 14' a selection program 15' originating in the code generator 5' serves to select the supplementary coding information 16' which is used for modifying the code generator. The basic code generators 17 and 17' on the one hand and the code generators 5 and 5' on the other hand are again identical (cf. FIG. 1). Since the two signal gates 14 and 14' are likewise identical the use of identical basic codes 6 and 6' results in the formation of identical encoding and decoding programs 3 and 3' respectively. In the decoding mixer 12 the clear information 1 is extracted from the encoded message 4 and from the decoding program 3' which is identical with the encoding program 3.

Figure 3:
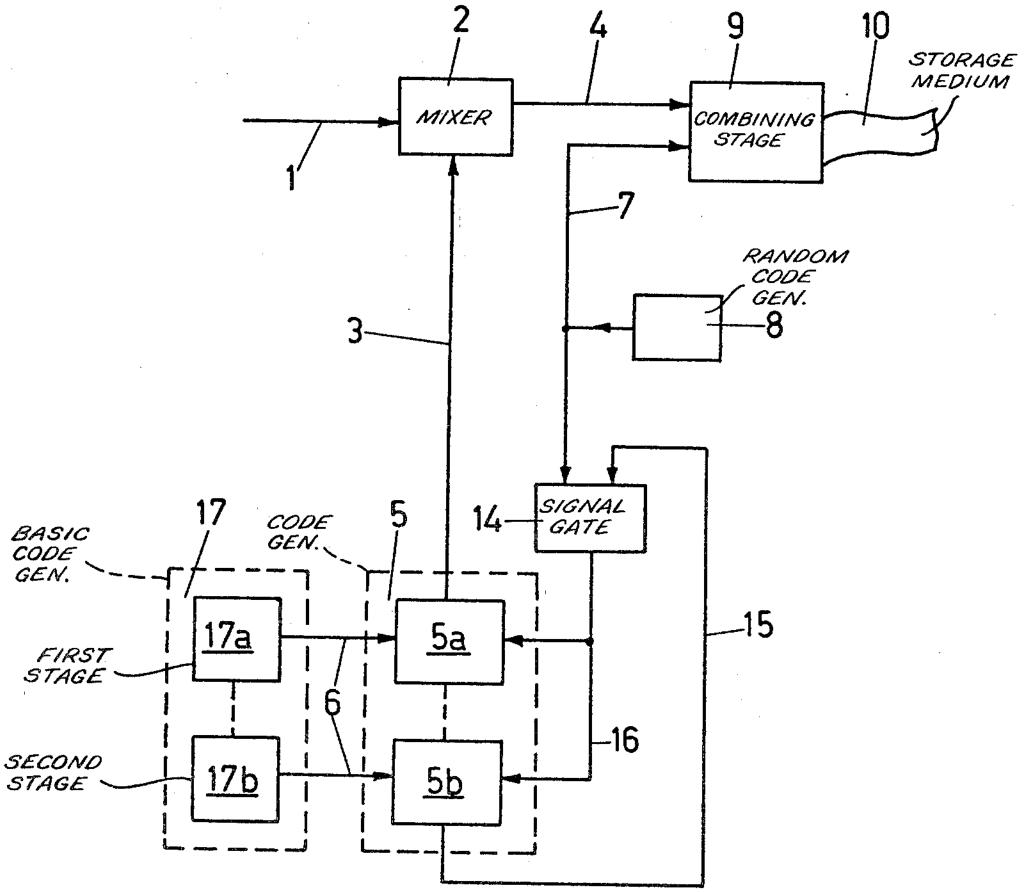
FIG. 3 is a modification of the encoding station shown in FIG. 2.

In a detail modification shown in FIG. 3 the basic code generator 17 and the code generator 5 are of two-stage construction. The two first stages 17*a* and 5*a* are used for the generation of the encoding program 3 and the two second stages 17*b* and 5*b* are used for generating the selection program 15. Both stages 5*a* and 5*b* of the code generator 5 are modified by the selected supplementary encoding information. The stages 17*a* and 17*b* as well as 5*a* and 5*b* may operate completely or at least partly independently of each other. The latter case is indicated in FIG. 3 by chain line connections between the stages.

If binary signals are to be processed the signal gates 14 and 14' may be constituted by simple AND gates.

The punched tapes shown in FIGS. 4 to 7 illustrate the spatial disposition or sequence in which the encoded message 4 and the supplementary code 7 may be recorded.

Figures 4, 5, 6:
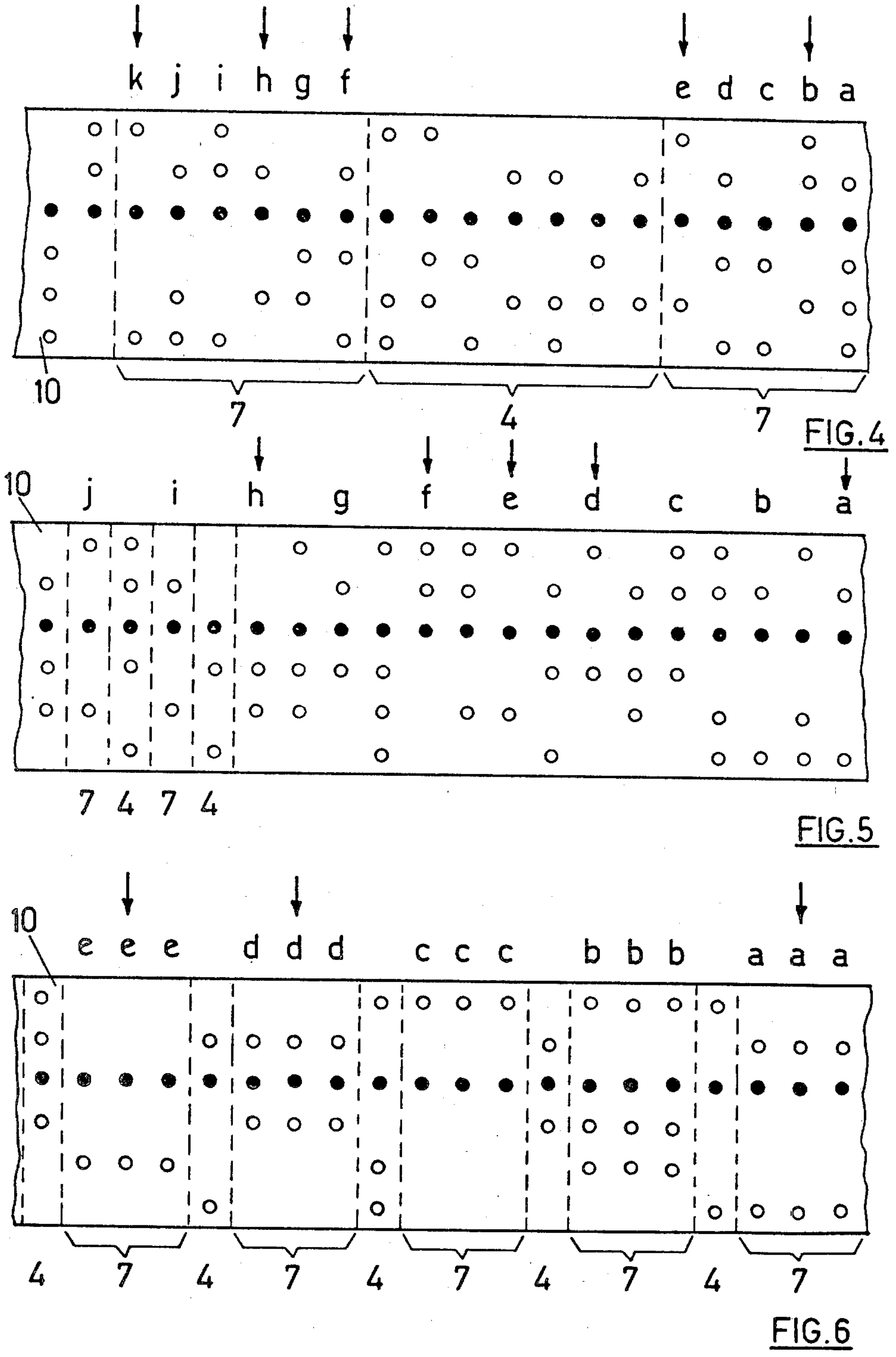
FIGS. 4 to 7 are examples of combined recordings of the encoded information and of the supplementary code on a storage medium.

In FIG. 4 the storage medium 10 is in the form of a five-channel punched tape (punched tape with five lines of information). Sections of the supplementary coding information 7 and of the encoded message 4 are punched alternately in the tape. Proceeding from the right hand end to the left a section containing supplementary coding information 7 is followed by a section of the encoded message 4. The sections of encoded message 4 directly follow sections of supplementary coding information 7. At the end of each section of encoded message there again follows a section of supplementary coding information and so forth. The several sections, principally the sections of encoded message, are normally substantially longer than shown in FIG. 4. The rows of holes representing the supplementary code are consecutively identified by small letters. The supplementary coding information 16 (FIG. 2) that has been selected by the signal gate 15 is indicated by arrows. In the illustrated example the rows of holes marked *b, e, f, h, k* . . . are selected for modifying the code generator, whereas the other rows of holes are not used. An unauthorized person looking at the punched tape 10 cannot possibly know which parts of the supplementary encoding information should be used for decoding and which parts should be neglected since, as above mentioned, the selection depends inter alia upon the secret basic code.

In the example according to FIG. 5 each section of coded message and each section of supplementary coding information comprises only one row of holes. The supplementary coding sections 7 are again consecutively identified by small letters *a, b, c* . . . *j*. The effect of the signal gate 14 (FIG. 2) is to pass only the arrowed rows of holes *a, d, e, f, h* . . . for modifying the encoding program.

Since the selected supplementary coding information modifies the encoding program, it is often desirable to repeatedly record the same section of the supplementary coding information on the storage medium 10. This is particularly appropriate in cases in which the information is transmitted to the storage medium by transmission means that are noisy, such as radio transmission. An example of repetitive recording is shown in FIG. 6. In this instance the same section of supplementary coding information 7 is punched into a tape three times in succession. Consequently three like rows of holes representing the same section of supplementary coding information 7 are followed by one row representing a section of the coded message 4 and this row is followed by three more like rows of one and the same section of supplementary code 7, and so forth. Consequently, whenever the transmission is subject to interference the correct supplementary coding information can be determined by majority decision. The supplementary coding information that is selected for modifying the encoding program is again indicated in FIG. 6 by arrows at *a, d* and *e*. Naturally, in the example in FIG. 6 the individual encoded message sections 4 between the repetitively recorded sections of supplementary coding information 7 may be considerably longer than one row of holes. The supplementary coding information that is transmitted in a cyclical fashion, i.e. at equal intervals, may also be used as synchronizing signals, particularly as an additional safeguard against error.

Figure 7:
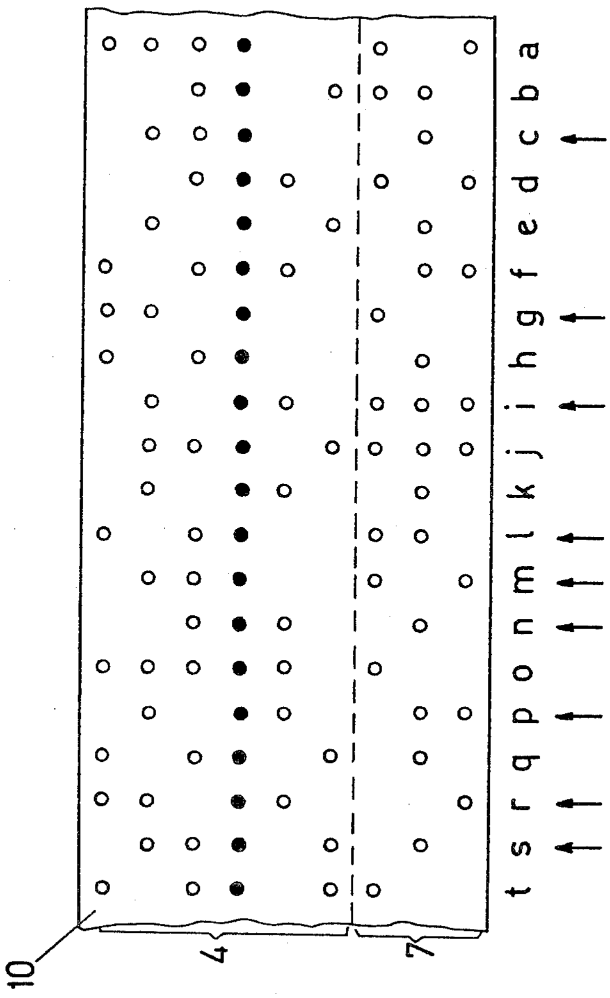

In FIG. 7 the storage medium 10 is an eight-channel punched tape. The encoded message 4 and the supplementary coding information 7 are not recorded in alternate sections, but punched in side-by-side. In the illustrated example the upper five rows of holes are intended for recording the encoded message 4, whereas the three bottom rows are for the supplementary code 7.

Besides the above described method of repetitive recording, the supplementary code on the storage medium other possibilities are available which will permit, so far as possible, the entire message to be decoded despite errors in the transmission of the supplementary coding information. On the one hand it is possible to make the message sections, at least at the beginning of the recording where as a matter of experience the majority of troubles arise, as short as possible to prevent faulty transmission of the supplementary coding information from interfering with the proper decoding of major sections of the encoded message. On the other hand it is possible, after relatively short intervals, for instance after 100 letters, or at the end of each line of a document, to record the entire transient state of the code generator 5. During decoding it is then possible to go back from a point where the clear message has become impossible to decode because of faulty transmission of the supplementary coding information, to the last record of the state of the code generator 5 for the purpose of rectifying the coding process by artificial variation of the supplementary coding information.

What is claimed is:

1. A method of coding information comprising, generating a secret basic code, generating a non-secret supplementary code, generating an encoding program derived from the secret basic code, selecting parts of the supplementary code in accordance with a selecting program derived from the secret basic code, modifying the encoding program by those parts of the supplementary code selected by said selecting program, coding the information with the modified encoding program, and recording the encoded information together with the supplementary code on a common record medium.

2. A method according to claim 1 including repeatedly recording each successive part of the supplementary code on said record medium.

3. A method according to claim 2 wherein each part of the supplementary code is repeatedly recorded in a cyclical fashion.

4. A method according to claim 1 wherein successive parts of the encoded information and successive parts of the supplementary code are recorded on the recording medium alternately.

5. A method according to claim 1 wherein the encoded information and the supplementary code are recorded side-by-side on the recording medium.

6. A method according to claim 4 wherein the storage medium is a five-channel punched tape, the five channels being used alternately for recording part of the encoded information and then part of the supplementary code.

7. A method according to claim 5 wherein the storage medium is an eight-channel punched tape, five channels being used to record the encoded information and the remaining three channels to record the supplementary code.

8. A method as claimed in claim 1 wherein the storage medium is magnetic tape.

9. A method of coding and decoding information comprising, generating a secret basic code, generating a non-secret supplementary code, generating an encoding program derived from the secret basic code, selecting parts of the supplementary code in accordance with a selecting program derived from the secret basic code, modifying the encoding program by those parts of the supplementary code selected by the selecting program, coding the information with the modified encoding program, recording the encoded information together with the supplementary code on a common record medium, reproducing from the record medium the encoded information and the supplementary code, generating the same secret basic code as used for the encoding program, generating a decoding program derived from the last mentioned secret basic code, using the decoding program to select the same parts of the reproduced supplementary code as those used for modifying the encoding program, modifying the decoding program by those selected parts of the reproduced supplementary code, and decoding the reproduced encoded information with the modified decoding program.

10. Apparatus for coding information, comprising, a secret basic code generator, a supplementary code generator, a generator responsive to the code generated by the secret basic code generator to provide an encoding program, gating means for selecting parts of the supplementary code in accordance with a selecting program derived from the secret basic code and applying the selected parts to the encoding program generator to modify the program generated thereby, means for encoding the information with the modified encoding program, and means for recording on a common record medium the encoded information and the supplementary code.

11. Apparatus according to claim 10 wherein the recording means comprises a five channel punched tape recorder adapted to record successive parts of the encoded information and the supplementary code alternately.

12. Apparatus according to claim 11 wherein said punched tape recorder is adapted to repetitively record each successive part of said supplementary code in a cyclical fashion.

13. Apparatus according to claim 10 wherein the recording means comprises an eight-channel punched tape recorder adapted to record the encoded information in five channels and the supplementary code in the remaining three channels.

14. Apparatus according to claim 10 wherein the secret basic code generator and the encoding program generator each comprise first and second stages, the first stages being used to generate the encoding programs and the second stages being used to generate the selection program.

* * * * *

UNITED STATES PATENT OFFICE
CERTIFICATE OF CORRECTION

Patent No. 3,711,645 Dated January 16, 1973

Inventor(s) KURT EHRAT

It is certified that error appears in the above-identified patent and that said Letters Patent are hereby corrected as shown below:

In the heading of the patent, the name of the Assignee is incorrectly spelled. It should be:

--- CIBA-GEIGY --- .

Signed and sealed this 29th day of May 1973.

(SEAL)
Attest:

EDWARD M.FLETCHER,JR.
Attesting Officer

ROBERT GOTTSCHALK
Commissioner of Patents